INVENTOR.
HARRY J. BARBER
BY
Richard W. Treverton
ATTORNEY

# United States Patent Office 3,036,838
Patented May 29, 1962

3,036,838
CHUCK FOR RING GEAR OR LIKE PART
Harry J. Barber, Rochester, N.Y., assignor to The Gleason Works, Rochester, N.Y., a corporation of New York
Filed Sept. 8, 1959, Ser. No. 838,755
6 Claims. (Cl. 279—2)

The present invention relates to a chuck for a ring gear or like part, for supporting such part on a spindle of a gear cutting machine, gear lapping or testing machine, or the like.

Satisfactory chucks of this kind, which act to grip the inner bore of the part and simultaneously draw the part rearwardly against a seat on the chuck, are in widespread use. An object of the invention is a chuck having these same desirable characteristics but which will be less expensive to manufacture. A more specific object is a chuck having expansible collets which are modifications of inexpensive resilient annular members of the kind commonly known as Belleville springs.

A chuck according to the invention comprises a body having on its front face a seat for the back face of the part, a cylindrical hub projecting forwardly from the front face and a central bore extending therethrough, the axes of the hub and the bore being coincident with the axis of rotation of the chuck, a draw bolt slidable in the bore and having a head spaced forwardly from the hub, and a pair of resilient and oppositely dished annular members seated respectively on the head and the hub, with their outer peripheral portions having plane surfaces perpendicular to said axis and in abutment with each other, the outer peripheral surfaces of said members being cylindrical, with their axes also coincident with said axis, said members being adapted to expand to grip the bore of said part upon axial flexure of the members effected by rearward motion of the draw bolt in the body, the inner peripheral portions of the back face of the back annular member and of the front face of the front annular member being plane and perpendicular to said axis and respectively being in abutment with plane shoulders on the chuck body and on the head of the draw bolt, and the remaining front and back face portions of each of said annular members being substantially conical and parallel.

A preferred embodiment of the invention is illustrated in the accompanying drawings, wherein.

Figure 1:
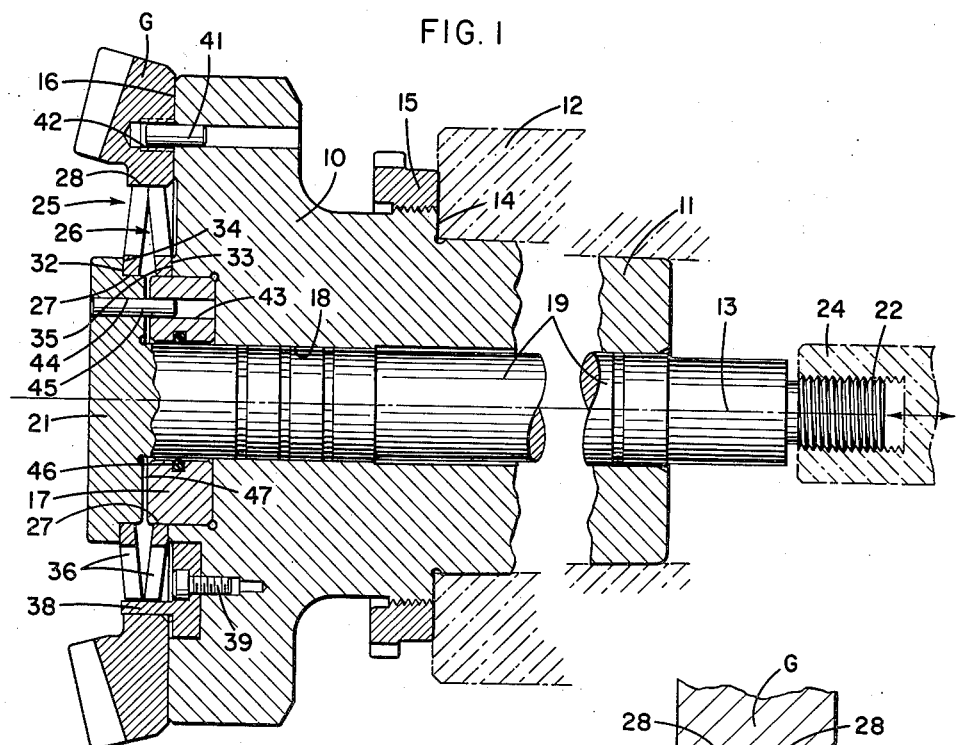
FIG. 1 is a section through the chuck and a bevel ring gear held thereby, in a plane containing their axis of rotation.

The chuck comprises a body 10 having a tapered shank 11 fitting a tapered bore in a machine spindle 12 whose rotation axis is designated 13. The body has a shoulder 14 for seating upon the front face of the spindle. An ejector ring 15 screw-threaded to the body is adapted, when turned in one direction, to press against the spindle and thereby draw the shank 11 from the bore of the spindle.

The front face 16 of the chuck body constitutes a seat for the rear face of a ring-shaped part, in this case bevel ring gear G. Projecting forwardly from the front of the body is a cylindrical hub 17, which in the illustrated embodiment comprises a ring pressed into a cylindrical recess in the body. However, if desired, the hub may be integral with the body. Extending through the body, including the hub, there is a cylindrical bore 18. Both this bore and the outer cylindrical surfaces of the hub are coaxial with rotation axis 13. A draw bolt 19 has a sliding fit in bore 18 and is centered thereby. The bolt has at its front end an integral cylindrical head 21 forwardly of hub 17, and, at its back end, a screw-threaded portion 22 for connection to a draw rod 24 for actuating the chuck.

Figure 3:
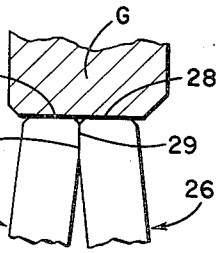
Figure 2:
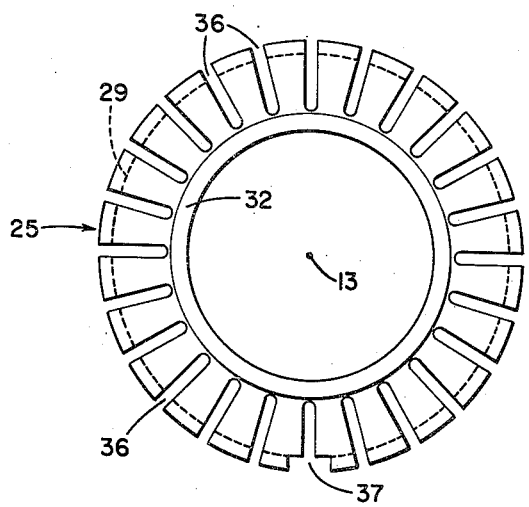
FIG. 2 is a front view, perpendicular to said axis, of the front annular resilient member; and, FIG. 3 is a fragmentary section in the same plane as FIG. 1 but on a larger scale.

A pair of resilient and oppositely dished annular members 25 and 26 are mounted respectively on the head 21 and the hub 17. These members are of the kind commonly called Belleville springs, modified in the following respects: Their inner and outer peripheral surfaces 27 and 28, respectively, are ground to accurate coaxial relation so that surfaces 27 closely fit cylindrical surfaces of head 21 and hub 17, and that, in the unflexed condition of the members, the surfaces 28 will slidably accommodate the bore of part G. As best shown in FIG. 3 the back face 29 of the outer peripheral portion of annular member 25, and the corresponding front face 31 of annular member 26, are formed as plane surfaces perpendicular to axis 13, so that upon compression of the members in the direction of the axis there will be no tendency for them to shift relative to each other in a radial direction. The inner peripheral portions of the annular members are similarly formed, an inner front face 32 of member 25 and inner back face 33 of member 26 being made plane surfaces perpendicular to axis 13, for seating respectively against plane shoulders 34 and 35 that are provided on the head 21 and the body 10. In order to increase the resilience of members 25 and 26, each of them is provided with a plurality of equally spaced slots 36 extending radially inwards from its outer periphery. A keyway 37 is formed in the outer peripheral portion of each member 25, 26.

These keyways 37 are held axially aligned by a key 38 which is fitted into them and into a recess in the front of body 10, being secured in the recess by a screw 39. The key serves as a driver which acts directly between the chuck body and the outer peripheral portions of the members 25, 26, so that the transmission of torque between the part G and the chuck body does not depend alone upon the fit of these members upon their supports 21, 17. In cases where the torque may be heavy, as in a spiral bevel gear cutting machine, a driving pin 41 may be secured to the chuck body 10 for engagement in a screw hole 42 or other recess in the part G. To preclude rotation of the draw bolt 19 in the body 10, there are aligned bores 43, 44 parallel to axis 13 in hub 17 and bolt head 21, and a pin 45 secured in one of these bores and having a sliding fit in the other.

In order to protect the chuck against the ingress of unwanted matter, an O-ring rubber seal 46 fitting around the draw bolt 19 is seated in an annular groove in the bore of hub 17; and the slots 36 of members 25 and 26 are filled with rubber, not shown.

In operation, with the chuck mounted on spindle 12 and the annular members 25, 26 uncompressed, a part G is placed on the chuck. The draw rod 24 is then drawn rearwardly relative to spindle 12 (to the right in FIG. 1), by a power-operated chuck actuator or other suitable means (not shown), the rod acting through the draw bolt 19, 21 to compress the members 25, 26 and thereby cause their outer peripheries to expand, by toggle action, to tightly grip the bore of part G. The same action results in the part being drawn firmly against its seat 16 on body 10. After the part has been tested, lapped, machined, or otherwise treated, the force applied to the draw rod is released. Thereupon the members 25, 26 spring back to their normal position, freeing the part for removal from the chuck. The front face of hub 17 and the back face of head 21 are adapted to abut to prevent damage to annular members 25, 26 by excessive flexure should the chuck be actuated when no part G, or a part with a greatly oversize bore, is mounted thereon. That is, the space 47 between the hub and the head is such that they will abut before the elastic limit of the annular members has been reached.

Having now described a preferred embodiment of the chuck, what I claim as my invention is:

1. A chuck for a ring gear or like part, comprising a body having on its front face a seat for the back face of the part, a cylindrical hub projecting forwardly from the front face and a central bore extending therethrough, the axes of the hub and the bore being coincident with the axis of rotation of the chuck, a draw bolt slidable in the bore and having a head spaced forwardly from the hub, and a pair of resilient and oppositely dished annular members seated respectively on the head and the hub, with their outer peripheral portions having plane surfaces perpendicular to said axis and in abutment with each other, the outer peripheral surfaces of said members being cylindrical, with their axes also coincident with said axis, said members being adapted to expand to grip the bore of said part upon axial flexure of the members effected by rearward motion of the draw bolt in the body, the inner peripheral portions of the back face of the back annular member and of the front face of the front annular member being plane and perpendicular to said axis and respectively being in abutment with plane shoulders on the chuck body and on the head of the draw bolt, and the remaining front and back face portions of each of said annular members being substantially conical and parallel.

2. A chuck according to claim 1 in which there is a keyway in the outer periphery of each of said annular members, and a key engaged in said keyways and secured to said body.

3. A chuck according to claim 1 in which said annular members have slots extending radially inwards from the outer peripheries thereof.

4. A chuck according to claim 1 in which there are aligned bores parallel to said axis in said head and hub, respectively, and a pin secured in one of said aligned bores and slidable in the other thereof.

5. A chuck for a ring gear or like part, comprising a body having on its front face a seat for the back face of the part, a cylindrical hub projecting forwardly from the front face and a central bore extending therethrough, the axes of the hub and the bore being coincident with the axis of rotation of the chuck, a draw bolt slidable in the bore and having a head spaced forwardly from the hub, and a pair of resilient and oppositely dished annular members seated respectively on the head and on the hub, the outer peripheral portions of said members having plane faces abutting each other and disposed in a plane perpendicular to said axis, the outer and inner peripheral surfaces of said members being cylindrical surfaces for engagement respectively with the bore of the part and cylindrical surfaces of the hub and head, and the inner peripheral portions of the back face of the back annular member and the front face of the front annular member being plane, perpendicular to said axis, and respectively abutting plane shoulders on the chuck body and on the head, the remaining front and back face portions of each of said annular members being substantially conical and parallel, said annular members each having a keyway in its outer periphery, and a key engaged in said keyways and secured to said body.

6. A chuck according to claim 5 in which the hub and the head are so closely spaced, when the annular members are unflexed, that upon rearward motion of the draw bolt they will abut before the elastic limit of said members is reached.

References Cited in the file of this patent
UNITED STATES PATENTS

| | | |
|---|---|---|
| 2,686,681 | Nyland | Aug. 17, 1954 |
| 2,734,750 | Nyland | Feb. 14, 1956 |
| 2,824,744 | Peters | Feb. 25, 1958 |

FOREIGN PATENTS

| | | |
|---|---|---|
| 191,291 | Switzerland | Aug. 16, 1937 |
| 548,690 | Great Britain | Oct. 20, 1942 |
| 582,377 | Great Britain | Nov. 13, 1946 |